United States Patent
Lin et al.

(10) Patent No.: US 11,470,596 B2
(45) Date of Patent: Oct. 11, 2022

(54) DETERMINATION OF START TIME OF PDCCH MONITORING OCCASION

(71) Applicant: Samsung Electronics Co., Ltd., Suwon-si (KR)

(72) Inventors: Hsien-Ping Lin, San Diego, CA (US); Jung Hyun Bae, San Diego, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 164 days.

(21) Appl. No.: 16/890,930

(22) Filed: Jun. 2, 2020

(65) Prior Publication Data

US 2021/0022121 A1  Jan. 21, 2021

Related U.S. Application Data

(60) Provisional application No. 62/875,728, filed on Jul. 18, 2019.

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01)

(58) Field of Classification Search
CPC ............................ H04W 72/042; H04L 5/001
See application file for complete search history.

(56) References Cited

U.S. PATENT DOCUMENTS

| 10,568,067 B2 | 2/2020 | Wong et al. |
| 2009/0088148 A1 | 4/2009 | Chung et al. |
| 2009/0238091 A1 | 9/2009 | Kim et al. |
| 2012/0057490 A1 | 3/2012 | Park et al. |
| 2013/0088972 A1 | 4/2013 | Kim et al. |
| 2014/0254420 A1 | 9/2014 | Kim et al. |

(Continued)

FOREIGN PATENT DOCUMENTS

| EP | 2 351 407 B1 | 1/2018 |
| EP | 3 451 553 A2 | 3/2019 |

(Continued)

OTHER PUBLICATIONS

ETSI TS 138 213 v 15.3.0 (Oct. 2018) Technical Specification 5G;NR; Physical layer procedure for control (Year: 2018).*

(Continued)

*Primary Examiner* — Chi Ho A Lee
(74) *Attorney, Agent, or Firm* — Lewis Roca Rothgerber Christie LLP (57) ABSTRACT

A method for performing PDCCH monitoring of component carriers (CCs) in a carrier aggregation scheme that aggregates a first CC and a second CC. In some embodiments, the method includes: calculating a first monitoring occasion start time for a monitoring occasion of the first CC, wherein the first monitoring occasion start time is expressed as a first symbol-index value; calculating a second monitoring occasion start time for a monitoring occasion of the second CC, wherein the second monitoring occasion start time is expressed as a second symbol-index value; and generating a schedule for the monitoring occasion of the first CC and the monitoring occasion of the second CC based on an ascending order of the first monitoring occasion start time and the second monitoring occasion start time.

20 Claims, 7 Drawing Sheets

(56) References Cited

U.S. PATENT DOCUMENTS

| | | | |
|---|---|---|---|
| 2014/0301343 A1 | 10/2014 | Park et al. | |
| 2018/0167957 A1* | 6/2018 | Noh | H04L 27/2602 |
| 2019/0098520 A1* | 3/2019 | Kim | H04W 76/27 |
| 2019/0306737 A1 | 10/2019 | Kwak et al. | |
| 2020/0008180 A1 | 1/2020 | Jo et al. | |
| 2020/0045569 A1 | 2/2020 | Seo et al. | |
| 2020/0084747 A1 | 3/2020 | Hong | |
| 2020/0162207 A1* | 5/2020 | Hwang | H04L 1/1812 |
| 2020/0358487 A1* | 11/2020 | Yang | H04L 1/1664 |
| 2021/0006376 A1* | 1/2021 | Cirik | H04L 5/0094 |
| 2021/0028893 A1* | 1/2021 | Hwang | H04L 5/0064 |
| 2021/0029561 A1 | 1/2021 | Lin et al. | |
| 2021/0274480 A1* | 9/2021 | Takeda | H04L 5/0007 |
| 2021/0307016 A1* | 9/2021 | Takeda | H04W 72/0493 |
| 2021/0352501 A1* | 11/2021 | Taherzadeh Boroujeni | H04W 72/0446 |
| 2021/0400652 A1* | 12/2021 | Yoshioka | H04W 72/0406 |

FOREIGN PATENT DOCUMENTS

| | | |
|---|---|---|
| EP | 3 624 481 A1 | 3/2020 |
| EP | 3 629 645 A1 | 4/2020 |
| KR | 10-2009-0033001 A | 4/2009 |
| KR | 10-2010-0051023 A | 5/2010 |
| WO | WO 2019/099443 A1 | 5/2019 |
| WO | WO 2019/213895 A1 | 11/2019 |
| WO | WO 2020/024202 A1 | 2/2020 |
| WO | WO 2020/029615 A1 | 2/2020 |
| WO | WO 2020/068290 A1 | 4/2020 |

OTHER PUBLICATIONS $3^{rd}$ Generation Partnership Project (3GPP), "Other aspects on carrier aggregation", TSG RAN WG1 Meeting #92bis, R1-1803841, Sanya, China, Apr. 16-20, 2018, published on Apr. 6, 2018, 6 pages.

$3^{rd}$ Generation Partnership Project (3GPP), "Corrections on bandwidth part and CA", TSG RAN WG1 Meeting #94bis, R1-1810112, Chengdu, China, Oct. 8-12, 2018, published on Sep. 29, 2018, 14 pages.

$3^{rd}$ Generation Partnership Project (3GPP) Technical Report 38.822 Release 15 version 15.0.1 clause 4.1, Jul. 25, 2019, 44 pages, available at https://www.3gpp.org/ftp//Specs/archive/38_series/38.822/38822-f01.zip.

$3^{rd}$ Generation Partnership Project (3GPP) Technical Specification 38.213 Release 15 version 15.9.0 clause 9.1.3, Apr. 3, 2020, 7 pages, available at https://www.3gpp.org/ftp//Specs/archive/38_series/38.213/38213-f90.zip.

$3^{rd}$ Generation Partnership Project (3GPP) Technical Specification 38.213 Release 16 version 16.1.0 clause 9.1.3, Apr. 3, 2020, 10 pages, available at https://www.3gpp.org/ftp//Specs/archive/38_series/38.213/38213-g10.zip.

$3^{rd}$ Generation Partnership Project (3GPP) Technical Specification 38.306 Release 15 version 15.9.0 clause 4.2.7.5, Apr. 6, 2020, 4 pages, available at https://www.3gpp.org/ftp//Specs/archive/38_series/38.306/38306-f90.zip.

$3^{rd}$ Generation Partnership Project (3GPP) Technical Specification 38.306 Release 16 version 16.0.0 clause 4.2.7.5, Apr. 8, 2020, 4 pages, available at https://www.3gpp.org/ftp//Specs/archive/38_series/38.306/38306-g00.zip.

Braun, V. et al., "5G NR Physical Downlink Control Channel: Design, Performance and Enhancements", IEEE Wireless Communications and Networking Conference, 2019, 6 pages, IEEE.

* cited by examiner

DETERMINATION OF START TIME OF PDCCH MONITORING OCCASION

CROSS-REFERENCE TO RELATED APPLICATION(S)

The present application claims priority to and the benefit of U.S. Provisional Application No. 62/875,728; filed Jul. 18, 2019, entitled "SYSTEM AND METHOD FOR PROVIDING SYMBOL INDEX BASED MONITORING OCCASION (MO) FOR TYPE-2 HARQ CODEBOOK", the entire content of which is incorporated herein by reference.

FIELD

One or more aspects of embodiments according to the present disclosure relate to 5G communications, and more particularly to a system and method for determining an order of multiple monitoring occasions on multiple respective component carriers.

BACKGROUND

A user equipment connected to a network through a plurality of component carriers in a carrier aggregation configuration may make downlink control information (DCI) decoding attempts in a plurality of monitoring occasions, each corresponding to a respective one of the component carriers. To report, after such a plurality of decoding attempts, the decoding attempt status of each of the decoding attempts, the user equipment may assemble the status information in a certain order. If the order in which the user equipment assembles the status information differs, however, from the order expected by the network, the network may incorrectly infer which of the sent DCIs were successfully received (i.e., successfully decoded) by the UE.

Thus, there is a need for a system and method for determining an order of multiple monitoring occasions on multiple respective component carriers.

SUMMARY

According to an embodiment of the present invention, there is provided a method for performing PDCCH monitoring of component carriers (CCs) in a carrier aggregation scheme that aggregates a first CC and a second CC, the method including: calculating a first monitoring occasion start time for a monitoring occasion of the first CC, wherein the first monitoring occasion start time is expressed as a first symbol-index value; calculating a second monitoring occasion start time for a monitoring occasion of the second CC, wherein the second monitoring occasion start time is expressed as a second symbol-index value; and generating a schedule for the monitoring occasion of the first CC and the monitoring occasion of the second CC based on an ascending order of the first monitoring occasion start time and the second monitoring occasion start time.

In some embodiments, the method further includes assembling a binary word indicating downlink control information (DCI) decoding success, the binary word including: a first bit indicating a decoding attempt status for the first monitoring occasion, and a second bit indicating a decoding attempt status for the second monitoring occasion, the first bit and the second bit being ordered, within the binary word, according to the schedule.

In some embodiments, the first symbol-index value is based on a symbol number of the first monitoring occasion.

In some embodiments, the first symbol-index value is further based on a slot number of the first monitoring occasion.

In some embodiments, the first symbol-index value is further based on a frame number of the first monitoring occasion.

In some embodiments, the first symbol-index value is further based on a numerology of the first CC.

In some embodiments, the first symbol-index value is further based on a number of slots per frame of the first CC.

In some embodiments, the carrier aggregation scheme aggregates a plurality of component carriers including the first CC and the second CC, wherein each of the component carriers has a respective numerology of a set of numerologies of the component carriers, wherein the first symbol-index value is: $2^{\mu_{max}-\mu_c} \times ((SFN \times numberOfSlotsPerFrame \times numberOfSymbolsPerSlot)+(slot\ number\ in\ the\ frame \times numberOfSymbolsPerSlot)+MO\ starting\ symbol\ number\ in\ the\ slot)$ wherein: $\mu_c$ is the numerology of the first CC, $\mu_{max}$ is the maximum value of the set of numerologies, and SFN is the frame number of the first monitoring occasion.

According to an embodiment of the present invention, there is provided a method for signaling decoding success within monitoring occasions, the method including: calculating a first symbol-index value, for a first monitoring occasion of a first component carrier (CC); calculating a second symbol-index value, for a first monitoring occasion of a second CC; and reporting: downlink control information (DCI) decoding success for the first monitoring occasion of the first CC, and DCI decoding success for the first monitoring occasion of the second CC; the reporting including reporting in a reporting order based on the first symbol-index value and based on the second symbol-index value.

In some embodiments, the method further includes assembling a binary word indicating DCI decoding success, the binary word including: a first bit indicating a decoding attempt status for the first monitoring occasion, and a second bit indicating a decoding attempt status for the second monitoring occasion, the first bit and the second bit being ordered, within the binary word, according to the schedule.

In some embodiments, the first symbol-index value is based on a symbol number of the first monitoring occasion.

In some embodiments, the first symbol-index value is further based on a slot number of the first monitoring occasion.

In some embodiments, the first symbol-index value is further based on a frame number of the first monitoring occasion.

In some embodiments, the first symbol-index value is further based on a numerology of the first CC.

In some embodiments, the first symbol-index value is further based on a number of slots per frame of the first CC.

In some embodiments, the UE receives a plurality of component carriers including the first CC and the second CC, wherein each of the component carriers has a respective numerology of a set of numerologies of the component carriers, wherein the first symbol-index value is: $2^{\mu_{max}-\mu_c} \times ((SFN \times numberOfSlotsPerFrame \times numberOfSymbolsPerSlot)+(slot\ number\ in\ the\ frame \times numberOfSymbolsPerSlot)+MO\ starting\ symbol\ number\ in\ the\ slot)$ wherein: $\mu_c$ is the numerology of the first CC, $\mu_{max}$ is the maximum value of the set of numerologies, and SFN is the frame number of the first monitoring occasion.

According to an embodiment of the present invention, there is provided a system, including: a network; and a user equipment (UE), including a processing circuit, the processing circuit being configured to: calculate a first symbol-index value, for a first monitoring occasion of a first component carrier (CC); calculate a second symbol-index value, for a first monitoring occasion of a second CC; and report: downlink control information (DCI) decoding success for the first monitoring occasion of the first CC, and DCI decoding success for the first monitoring occasion of the second CC; the reporting including reporting in a reporting order based on the first symbol-index value and on the second symbol-index value.

In some embodiments, the processing circuit is further configured to assemble a binary word indicating DCI decoding success, the binary word including: a first bit indicating a decoding attempt status for the first monitoring occasion, and a second bit indicating a decoding attempt status for the second monitoring occasion, the first bit and the second bit being ordered, within the binary word, according to the schedule.

In some embodiments, the first symbol-index value is based on a symbol number of the first monitoring occasion.

In some embodiments, the first symbol-index value is further based on a slot number of the first monitoring occasion.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for determining an order of multiple monitoring occasions on multiple respective component carriers provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
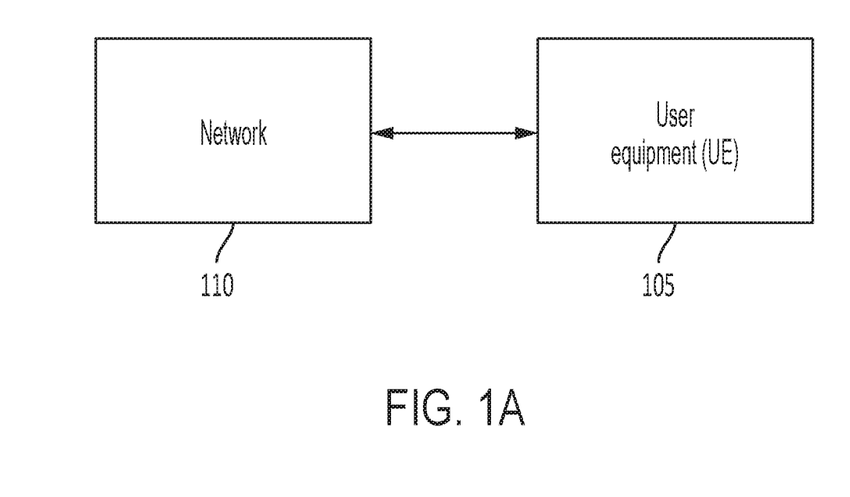
FIG. 1A is a block diagram, according to an embodiment of the present disclosure.

FIG. 1A is a simplified block diagram of two components of a 5G communication system, in some embodiments. A user equipment (UE) 105 forms a connection (e.g., a wireless connection) with a network 110 (e.g., with a base station of the network 110). In the 5G new radio (NR) specification, a user equipment (UE) may monitor a physical downlink control channel (PDCCH) search space (SS) to obtain downlink control information (DCI) which includes control information for the UE's downlink operation. Each time instance of PDCCH SS (e.g., each symbol in which a DCI may occur) is referred to as a monitoring occasion (MO). As used herein, certain phrases, such as "user equipment" and "downlink control information" are used as countable nouns even though the nouns they contain (e.g., "equipment" and "information") may not be countable in ordinary English.

Figure 1B:
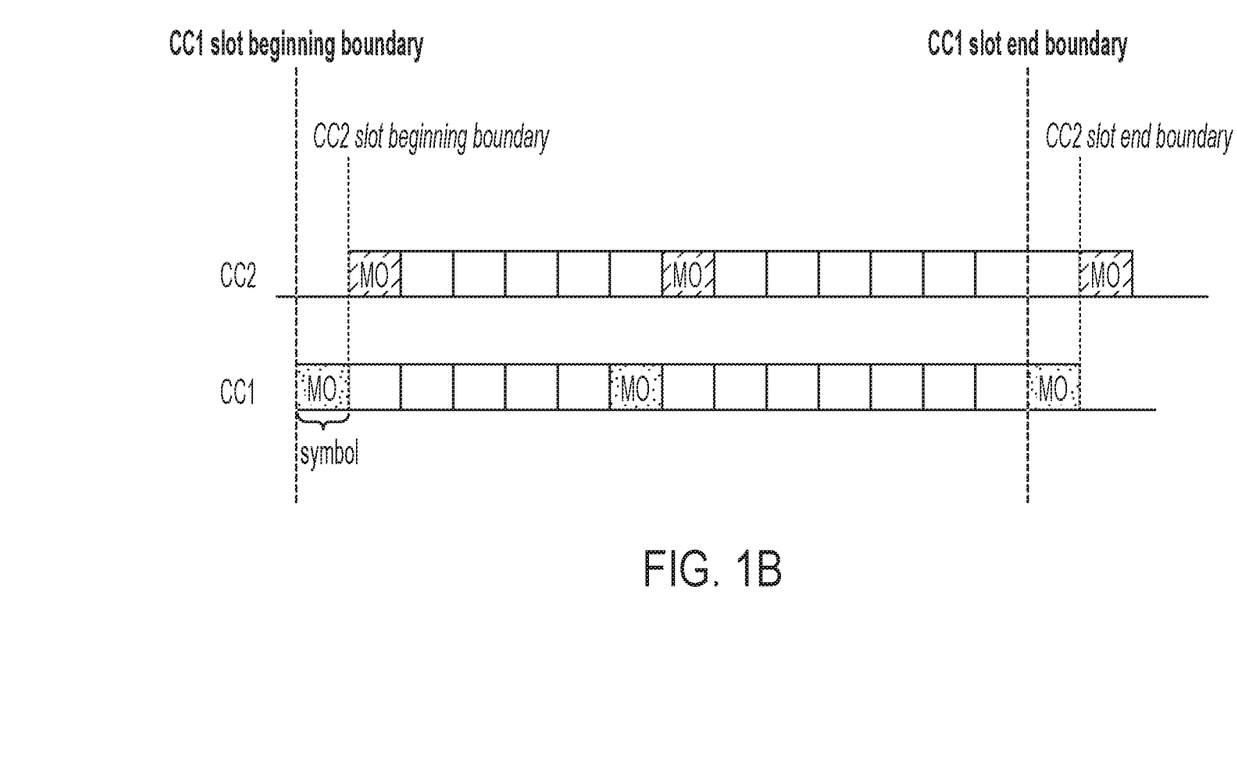
FIG. 1B is a symbol sequence diagram, according to an embodiment of the present disclosure.

In the technical specification identified as TS 38.213, Subclause 9.1.3, published by the 3rd Generation Partnership Project, the ordering of PDCCH MOs is described to be based, in ascending order, on the start times of the MOs in the search space set across active downlink bandwidth parts (DL BWPs) of configured serving cells. However, in carrier aggregation (CA), cells may not be fully synchronized. For example, a timing difference up to 8.5 us is allowed for FR2, which is about a symbol duration if the subcarrier spacing (SCS) is 120 kHz. In this case, the symbol boundary may be mismatched as shown in FIG. 1B. As used herein, symbol boundaries are not "mismatched" if a symbol boundary (e.g., the boundary between symbol 0 and symbol 1) in one component carrier (CC) occurs at the same time as the same boundary (e.g., the boundary between symbol 0 and symbol 1) in another component carrier. As such, the symbol boundaries illustrated in FIG. 1B are considered mismatched even though a boundary in the signal from CC 1 (the boundary between symbol 0 and symbol 1) is drawn as coinciding with a boundary in CC2 (the slot boundary in CC2, i.e., the boundary between symbol 13 and symbol 0). The timing difference shown in FIG. 1B may be observed at a DL receiver, i.e. at a UE, and therefore this information (i.e., the extent to which symbol boundaries are mismatched) may not be exactly known by the network.

This situation may create ambiguity and mismatch, in determining MO start time, between a UE and a network, which may cause malfunction of the system. For example, a UE may create a binary word, that it populates, one bit at a time, each bit indicating the decoding attempt status for an MO (i.e., each bit indicating whether or not the UE was able to decode a DCI from the MO). In some embodiments, the UE may create the bits of the binary word in the order in which the corresponding MOs started at the UE, and it may send the binary word to the network. In this situation, it may be that the network, unaware of the order in which MOs of different component carriers arrived at the base station, will interpret the bits of the DCI reception report incorrectly, interchanging, in some instances, the component carriers to which certain bits correspond. The order of the bits in such a binary word may also be referred to as a "schedule".

A counter downlink assignment indicator (C-DAI) field in DCI format 1_0 or DCI format 1_1 is used for the Type-2 HARQ-ACK codebook construction, according to TS 38.213. The value of C-DAI in a DCI is accumulated with respect to the serving cell index of the associated PDSCH transmission and the PDCCH monitoring occasion (MO) ordering. According to TS 38.213, the ordering of MOs in the time domain depends on the ordering of start time of the search space sets across configured serving cells. However, in some cases, the timing difference can be up to one symbol, which may cause ambiguity on the determination of MO ordering and the interpretation of the associated C-DAI value. Consequently, the relation between MO ordering and the associated counter downlink assignment indicator (C-DAI) field of DCI format 1_0 or DCI format 1_1 may be ambiguous, which may affect the Type-2 HARQ-ACK codebook determination.

In some embodiments, the ambiguity that may result from such a mismatch is addressed by instead making a start time determination, of each PDCCH MO, that does not depend on any timing difference among CC's, i.e., that is the same, whether or not all of the CC's are timing aligned. For example, for each MO in a cell c, the following symbol-index-based metric may be used to represent the start time of an MO:

$$MO_{start\ time,c} = 2^{\mu_{max} - \mu_c} \times ((SFN \times numberOfSlotsPerFrame \times numberOfSymbolsPerSlot) + (slot\ number\ in\ the\ frame \times numberOfSymbolsPerSlot) + MO\ starting\ symbol\ number\ in\ the\ slot),$$

where $\mu_c$ is the numerology of cell c and $\mu_{max}$ is the largest numerology among configured cells (i.e., among the component carriers).

In the equation above, the term SFN×numberOfSlotsPerFrame×numberOfSymbolsPerSlot is the number of symbols before system frame SFN in which the MO is located, the term slot number in the frame×numberOfSymbolsPerSlot is the number of symbols before the slot N (N being the slot number within the frame) and within the system frame in which the MO is located, and, therefore, $MO_{start\ time,c}$ may be used as a universal symbol index for the MO based on the largest SCS among the CCs. In some embodiments, the index system begins from 0 for SFN, N, and symbol number within a slot. With a symbol-index-based metric such as that defined above, the notion of timing is specified and the ordering of MOs can be determined without ambiguity, i.e., a monitoring occasion $MO_i$ has an earlier timing than a monitoring occasion $MO_j$ if the $MO_{start\ time,c}$ value associated with $MO_i$ is smaller than the one associated with $MO_j$.

The use of a symbol-index value to determine an unambiguous order for MOs in different CCs may be equivalent to assuming all DL CCs are aligned in time (i.e., there are no DL timing differences (or "mismatches") across DL carriers. It may also be equivalent to calculating the symbol-index value based on the assumption that all the DL CCs are synchronized.

Figure 2:
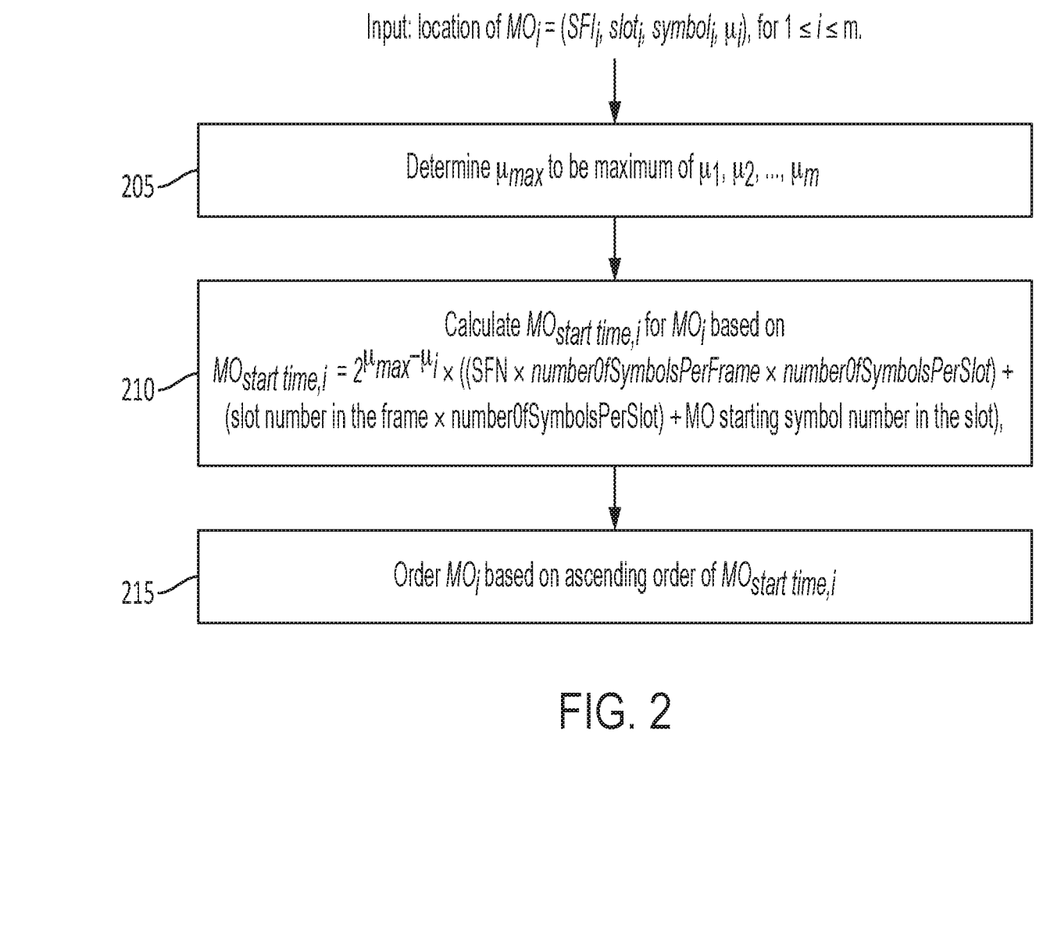
FIG. 2 is a flow chart, according to an embodiment of the present disclosure.

FIG. 2 shows the calculation of $MO_{start\ time,c}$ and the associated ordering. In FIG. 2, $SF_i$ is the system frame number of the system frame in which the $i^{th}$ monitoring occasion, $MO_i$, is located, $slot_i$ is the slot number of the slot within the system frame in which $MO_i$ is located, $symbol_i$ is the symbol number of the symbol within the slot in which $MO_i$ is located, and $\mu_i$ is the numerology of the configured cell (i.e., of the component carrier) for $MO_i$. In the method of FIG. 2, the UE (i) determines, at 205, the maximum numerology over all of the CCs, (ii) calculates, at 210, the MO start time for each MO in each CC based on the equation shown, and (iii) orders, at 215, the MOs in ascending order, based on the calculated MO start times.

Figure 3A:
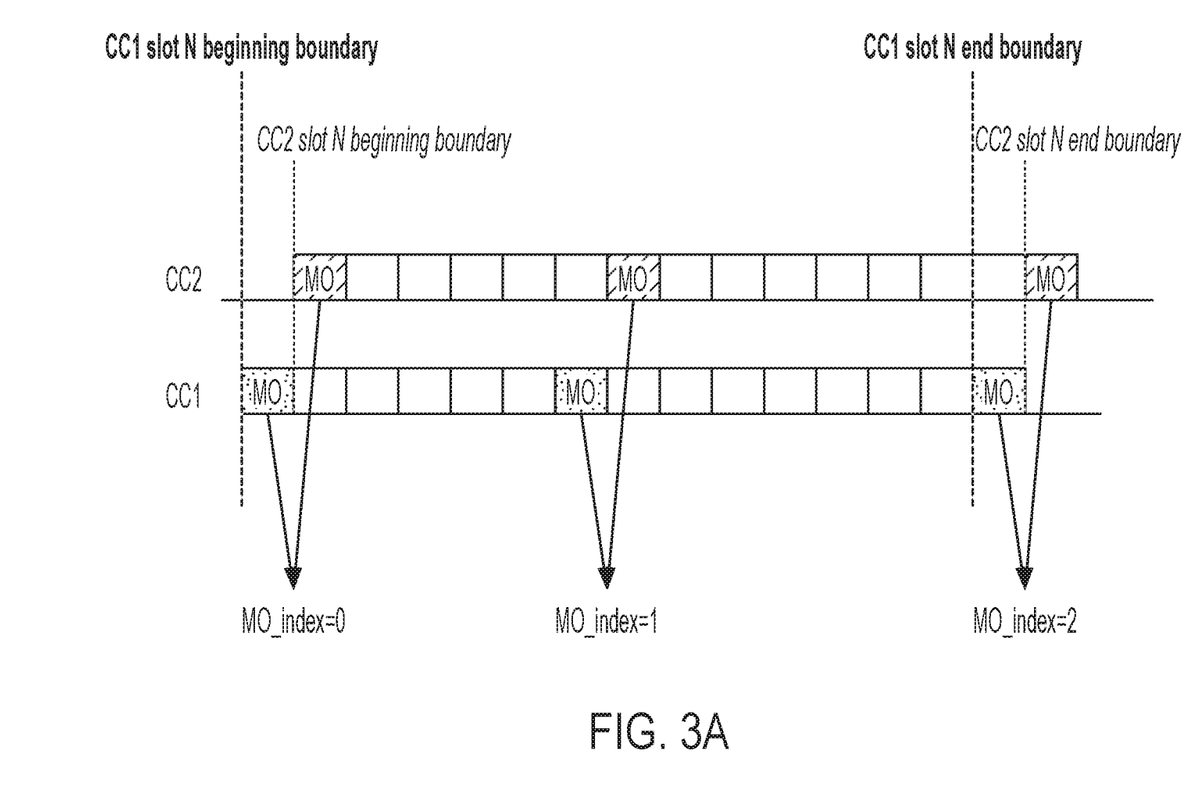
FIG. 3A is a symbol sequence diagram, according to an embodiment of the present disclosure.

For the case when DL CCs are not synchronized, the symbol-index-based metric provides a clear timing relation among MOs, which is illustrated in FIG. 3A. In this example, CC1 and CC2 have the same numerology SCS=15 kHz, i.e., $\mu_{max} = \mu_c = 0$, the system frame=1 and slot number N=2 within the system frame in which the first MOs are located for both CCs. In this case, the symbol-index value for the first MO shown for CC1 is $MO_{start\ time,cc1} = 2^{\mu_{max} - \mu_c} \times ((SFN \times numberOfSlotsPerFrame \times numberOfSymbolsPerSlot) + (slot\ number\ in\ the\ frame \times numberOfSymbolsPerSlot) + MO\ starting\ symbol\ number\ in\ the\ slot) = 2^0 \times ((1 \times 10 \times 14) + (2 \times 14) + 0) = 168$. The calculation for the first MO in CC2 in the figure has the same value and therefore both MOs are considered to have the same MO starting time.

Figure 3B:
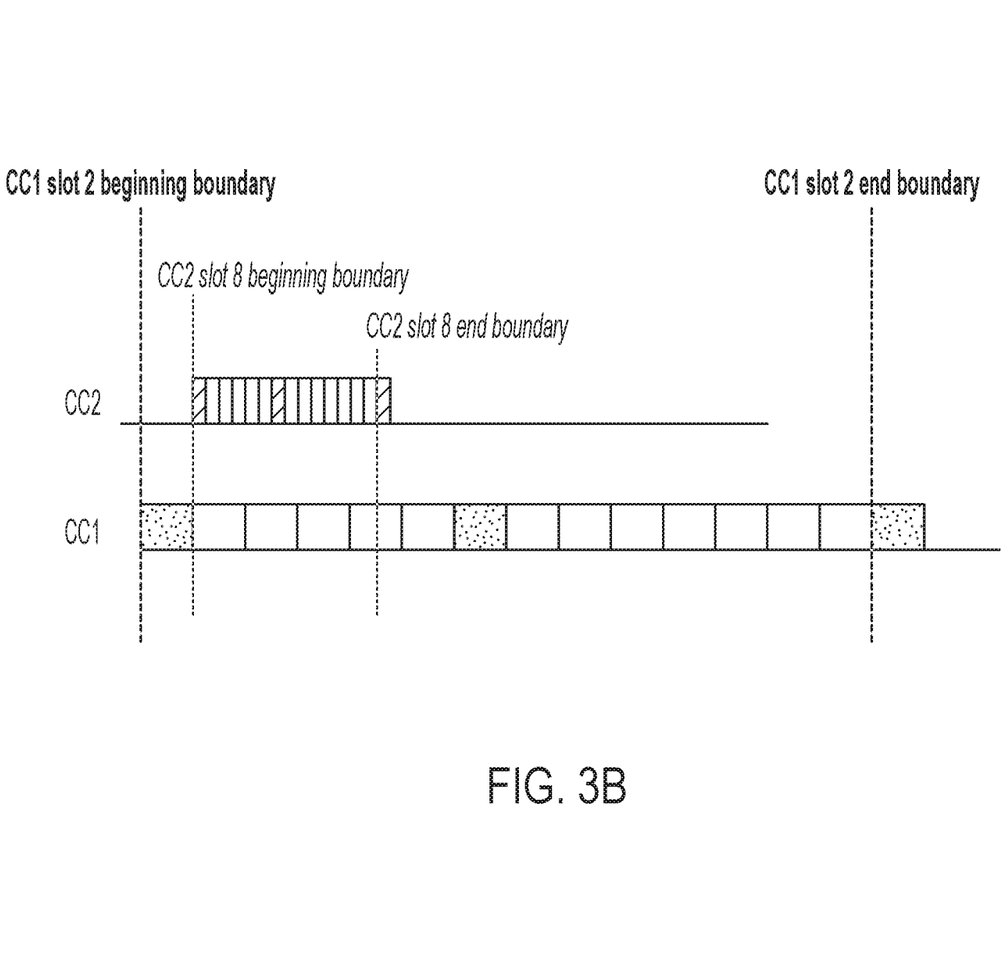
FIG. 3B is a symbol sequence diagram, according to an embodiment of the present disclosure.

As another example, based on FIG. 3B, with CC2 having a numerology of 2 instead of 0, the symbol-index value for the first MO in CC1 is $4 \times ((1 \times 10 \times 14) + (2 \times 14) + 0) = 672$, and the symbol-index value for the first MO in CC2 (for which there are 40 slots per frame and the slot number may be 8) is $1 \times ((1 \times 40 \times 14) + (8 \times 14) + 0) = 672$. If, as is the case in the above examples, the symbol-index value is the same for two CCs, the base station identifier may be used as a tie-breaker, e.g., the MO in the CC having the lower base station identifier may be deemed to precede the other. The UE may be informed of the system frame number SFN by the network, and there may be only one SFN across all of the CCs. Successful reception of the SFN from the network by the UE may be a condition for establishing a connection between the UE and the network.

Figure 4A:
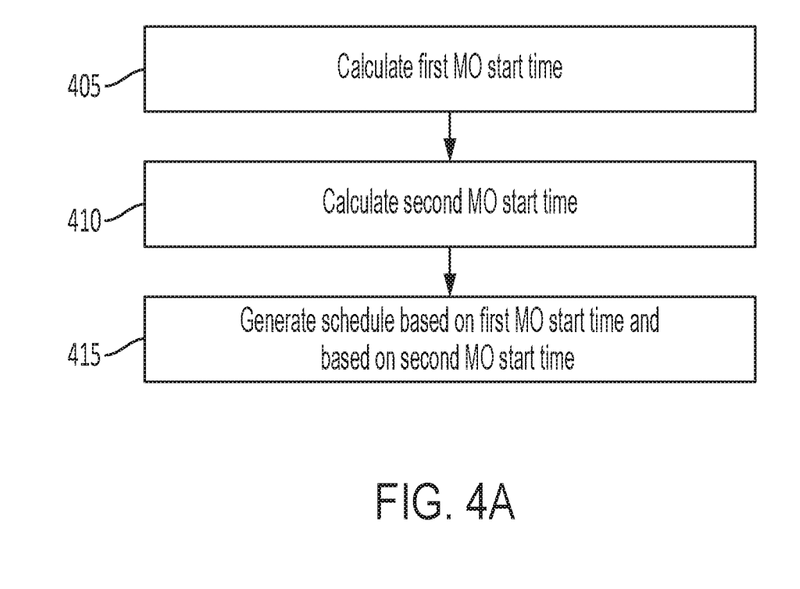
FIG. 4A is a flow chart, according to an embodiment of the present disclosure.
Figure 4B:
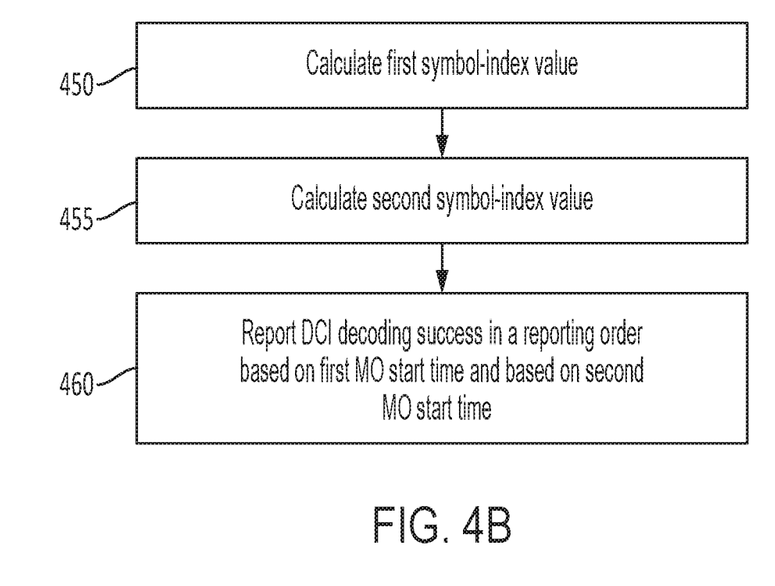
FIG. 4B is a flow chart, according to an embodiment of the present disclosure.

FIGS. 4A and 4B are flow charts illustrating methods, according to respective embodiments. In the embodiment of FIG. 4A, the UE (i) calculates, at 405, a first MO start time, expressed as a first symbol-index value, (ii) calculates, at 410, a second MO start time, expressed as a second symbol-index value, and (iii) generates, at 415, a schedule for the monitoring occasion of the first CC and the monitoring occasion of the second CC, the schedule being based on an ascending order of the first monitoring occasion start time and the second monitoring occasion start time. In the embodiment of FIG. 4B, the UE (i) calculates, at 450, a first symbol-index value for a first monitoring occasion of a first CC (ii) calculates, at 455, a second symbol-index value, for a first monitoring occasion of a second CC, and (iii) reports, at 460, (1) DCI decoding success for the first monitoring occasion of the first CC, and (2) DCI decoding success for the first monitoring occasion of the second CC, the reporting involving reporting in a reporting order based on the first symbol-index value and based on the second symbol-index value.

In some embodiments, the network includes a first processing circuit (e.g., one or more CPUs), and the UE contains a processing circuit. The processing circuits may perform the some or all of the methods described herein, e.g., sending and receiving (through suitable transmitting and receiving hardware, such as radio, microwave, or mm-wave transmitters and receivers, some of which may be external to the processing circuits) configuration information, DCIs, and other information, e.g., user data. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for determining an order of multiple monitoring occasions on multiple respective component carriers have been specifically described and illustrated herein, many modifications and variations will be apparent to those skilled in the art. Accordingly, it is to be understood that a system and method for determining an order of multiple monitoring occasions on multiple respective component carriers constructed according to principles of this disclosure may be embodied other than as specifically described herein. The invention is also defined in the following claims, and equivalents thereof.

What is claimed is:

1. A method for performing PDCCH monitoring of component carriers (CCs) in a carrier aggregation scheme that aggregates a first CC and a second CC, the method comprising:
    calculating a first monitoring occasion start time for a monitoring occasion of the first CC, wherein the first monitoring occasion start time is expressed as a first symbol-index value;
    calculating a second monitoring occasion start time for a monitoring occasion of the second CC, wherein the second monitoring occasion start time is expressed as a second symbol-index value;
    generating a schedule for the monitoring occasion of the first CC and the monitoring occasion of the second CC based on the first symbol-index value and based on the second symbol-index value; and
    reporting decoding success in a reporting order based on the schedule.

2. The method of claim 1, further comprising assembling a binary word indicating downlink control information (DCI) decoding success, the binary word comprising:
    a first bit indicating a decoding attempt status for the first monitoring occasion, and
    a second bit indicating a decoding attempt status for the second monitoring occasion,
    the first bit and the second bit being ordered, within the binary word, according to the schedule.

3. The method of claim 1, wherein the first symbol-index value is based on a symbol number of the first monitoring occasion.

4. The method of claim 3, wherein the first symbol-index value is further based on a slot number of the first monitoring occasion.

5. The method of claim 4, wherein the first symbol-index value is further based on a frame number of the first monitoring occasion.

6. The method of claim 5, wherein the first symbol-index value is further based on a numerology of the first CC.

7. The method of claim 6, wherein the first symbol-index value is further based on a number of slots per frame of the first CC.

8. The method of claim 7, wherein the carrier aggregation scheme aggregates a plurality of component carriers including the first CC and the second CC, wherein each of the component carriers has a respective numerology of a set of numerologies of the component carriers, wherein the first symbol-index value is:

$2^{\mu_{max}-\mu_c} \times ((\text{SFN} \times \text{numberOfSlotsPerFrame} \times \text{numberOfSymbolsPerSlot}) + (\text{slot number in the frame} \times \text{numberOfSymbolsPerSlot}) + \text{MO starting symbol number in the slot})$ wherein:
$\mu_c$ is the numerology of the first CC,
$\mu_{max}$ is the maximum value of the set of numerologies, and
SFN is the frame number of the first monitoring occasion.

9. A method for signaling decoding success within monitoring occasions, the method comprising:
calculating a first symbol-index value, for a first monitoring occasion of a first component carrier (CC);
calculating a second symbol-index value, for a first monitoring occasion of a second CC; and
reporting:
downlink control information (DCI) decoding success for the first monitoring occasion of the first CC, and
DCI decoding success for the first monitoring occasion of the second CC;
the reporting comprising reporting in a reporting order based on the first symbol-index value and based on the second symbol-index value.

10. The method of claim 9, further comprising assembling a binary word indicating DCI decoding success, the binary word comprising:
a first bit indicating a decoding attempt status for the first monitoring occasion of the first CC, and
a second bit indicating a decoding attempt status for the first monitoring occasion of the second CC,
the first bit and the second bit being ordered, within the binary word, based on the first symbol-index value and based on the second symbol-index value.

11. The method of claim 9, wherein the first symbol-index value is based on a symbol number of the first monitoring occasion of the first CC.

12. The method of claim 11, wherein the first symbol-index value is further based on a slot number of the first monitoring occasion of the first CC.

13. The method of claim 12, wherein the first symbol-index value is further based on a frame number of the first monitoring occasion of the first CC.

14. The method of claim 13, wherein the first symbol-index value is further based on a numerology of the first CC.

15. The method of claim 14, wherein the first symbol-index value is further based on a number of slots per frame of the first CC.

16. The method of claim 15, wherein the UE receives a plurality of component carriers including the first CC and the second CC, wherein each of the component carriers has a respective numerology of a set of numerologies of the component carriers, wherein the first symbol-index value is:

$2^{\mu_{max}-\mu_c} \times ((\text{SFN} \times \text{numberOfSlotsPerFrame} \times \text{numberOfSymbolsPerSlot}) + (\text{slot number in the frame} \times \text{numberOfSymbolsPerSlot}) + \text{MO starting symbol number in the slot})$ wherein:
$\mu_c$ is the numerology of the first CC,
$\mu_{max}$ is the maximum value of the set of numerologies, and
SFN is the frame number of the first monitoring occasion of the first CC.

17. A system, comprising:
a network; and
a user equipment (UE), comprising a processing circuit, the processing circuit being configured to:
calculate a first symbol-index value, for a first monitoring occasion of a first component carrier (CC);
calculate a second symbol-index value, for a first monitoring occasion of a second CC; and
report:
downlink control information (DCI) decoding success for the first monitoring occasion of the first CC, and
DCI decoding success for the first monitoring occasion of the second CC;
the reporting comprising reporting in a reporting order based on the first symbol-index value and on the second symbol-index value.

18. The system of claim 17, wherein the processing circuit is further configured to assemble a binary word indicating DCI decoding success, the binary word comprising:
a first bit indicating a decoding attempt status for the first monitoring occasion of the first CC, and
a second bit indicating a decoding attempt status for the first monitoring occasion of the second CC,
the first bit and the second bit being ordered, within the binary word, based on the first symbol-index value and based on the second symbol-index value.

19. The system of claim 17, wherein the first symbol-index value is based on a symbol number of the first monitoring occasion of the first CC.

20. The system of claim 19, wherein the first symbol-index value is further based on a slot number of the first monitoring occasion of the first CC.

* * * * *